(12) United States Patent
Diethelm et al.

(10) Patent No.: US 12,548,463 B2
(45) Date of Patent: Feb. 10, 2026

(54) ELECTRONIC COUPLING OF CONTROLS

(71) Applicant: Loft Dynamics AG., Dübendorf (CH)

(72) Inventors: Hannes Diethelm, Dübendorf (CH); Christian Marty, Dübendorf (CH)

(73) Assignee: LOFT DYNAMICS AG., Dübendorf (CH)

( * ) Notice: Subject to any disclaimer, the term of this patent is extended or adjusted under 35 U.S.C. 154(b) by 0 days.

(21) Appl. No.: 18/962,658

(22) Filed: Nov. 27, 2024

(65) Prior Publication Data

US 2025/0174149 A1     May 29, 2025

Related U.S. Application Data

(60) Provisional application No. 63/603,537, filed on Nov. 28, 2023.

(51) Int. Cl.
*G09B 9/28* (2006.01)
*G09B 9/46* (2006.01)

(52) U.S. Cl.
CPC ................... *G09B 9/28* (2013.01); *G09B 9/46* (2013.01)

(58) Field of Classification Search
CPC .............. G09B 9/28; G09B 9/46; G09B 9/00
See application file for complete search history.

(56) References Cited

U.S. PATENT DOCUMENTS

| 7,660,656 B2 * | 2/2010 | Miyamaru | G09B 9/058 434/61 |
|---|---|---|---|
| 2016/0140875 A1 * | 5/2016 | Kumar | A61B 90/37 434/262 |
| 2021/0343178 A1 | 11/2021 | Nissen et al. | |

FOREIGN PATENT DOCUMENTS

EP     3282998 B1     9/2019

OTHER PUBLICATIONS

Kucuktabak EB, Wen Y, Short M, Demirbas E, Lynch K, Pons J. Virtual Physical Coupling of Two Lower-Limb Exoskeletons. IEEE Int Conf Rehabil Robot. Sep. 2023;2023:1-6. doi: 10.1109/ICORR58425.2023.10304601. PMID: 37941279.
Luigi Gammieri et al., "Coupling of a Redundant Manipulator with a Virtual Reality Environment to Enhance Human-robot Cooperation", Procedia CIRP, vol. 62, 2017, pp. 618-623, ISSN 2212-8271, https://doi.org/10.1016/j.procir.2016.06.056. (https://www.sciencedirect.com/science/article/pii/S2212827116306746).
"SMARTS—Telerobitc Satellite Servicing" https://smarts.lesr.jhu.edu/research/telerobotic-satellite-servicing/, accessed Jan. 3, 2025, 9 pages.

* cited by examiner

*Primary Examiner* — Timothy A Musselman
(74) *Attorney, Agent, or Firm* — HAYES SOLOWAY P.C.

(57) ABSTRACT

A flight simulation system and method with electronic coupling of controls include a physical simulation environment providing flight simulation to a trainee. At least one physical control element is in the physical simulation environment. An instructor environment is located remote from the physical simulation environment. At least one instructor control element is in the instructor environment. The at least one physical control element and the at least one instructor control element are electronically and non-mechanically coupled together.

18 Claims, 5 Drawing Sheets

ELECTRONIC COUPLING OF CONTROLS

CROSS REFERENCE TO RELATED APPLICATION

This application claims benefit to U.S. Provisional Patent Application Ser. No. 63/603,537, filed Nov. 28, 2023, entitled "Electronic Coupling of Controls", the entire contents of which is incorporated herein by reference.

FIELD OF THE DISCLOSURE

The present disclosure relates to electronic controls used in simulation systems. The disclosure has particular utility in electronic coupling of controls for aircraft simulation systems, and will be described in connection with such utility, although other utilities are contemplated.

BACKGROUND AND SUMMARY

This section provides background information related to the present disclosure which is not necessarily prior art. This section provides a general summary of the disclosure and is not a comprehensive disclosure of its full scope or all its features.

Flight simulation is used to artificially generate aircraft flight and an environment in which the aircraft flies, for pilot training, design, or other purposes. Flight simulators typically virtually recreate situations of aircraft flight, including how aircraft react to applications of flight controls, the effects of other aircraft systems, and how the aircraft reacts to external factors such as air density, turbulence, wind shear, cloud, precipitation, etc. Flight simulation is used for a variety of reasons, including flight training pilots, the design and development of the aircraft itself, and research into aircraft characteristics and control handling qualities. Some simulations are based on previously recorded flights which are virtually recreated for a pilot.

In cockpits equipped to instruct student pilots, typically the instructor's seat is mechanically coupled to the student's seat, often like in the real aircraft, allowing the instructor to quickly intervene the controls if necessary. Teaching with remote instructors is an attractive cost-saving option, since simulators can be built smaller and more efficiently. For instance, the moving platforms on which the student pilots sit can be manufactured to accommodate one individual and not two, and duplicated control equipment used in the simulator can sometimes be omitted. Additionally, using remote instructors means that instructor personnel can often be located offsite from the simulators, which can decrease travel and personnel expense. However, despite not being physically on the simulator platform, remote instructors may still need the option to intervene into the controls of the pilot.

Various industries have sought to use systems which use electronic communications with mechanical links between active and remote control equipment. For instance, EP3282998A1 is directed to telerobotic surgery system for remote surgeon training using remote surgery station and party conferencing, and it discloses the use of electronic and/or communications-based coupling between the console of a remote instructor and that of a student or secondary console in telerobotic or robot-assisted surgeries. Additionally, various publications have been put forth to discuss virtual coupling for telerobotics or similar use cases which uses a similar approach, including the use of virtual human-to-human coupling of two exoskeletons, one worn by an instructor and one worn by a patient/student for rehabilitation purposes or kinematically modeling a robot manipulator and virtually coupling a simulated controller to a real manipulator for human-robot tasks. However, despite these disclosures, there still exists a need for electronic coupling of controls to provide student-to-remote instructor functionality with flight simulators.

To improve over these limitations of conventional simulation system, the present disclosure is directed to a simulation system and method with electronic coupling of controls, which allows for a virtual coupling solution between an instructor and a student console in a flight simulator. Such a virtual coupling can effectively tune forces between the instructor and the student, for example, such that the instructor needs less force to control the aircraft than the student would need. Additionally, virtual coupling can integrate specific autopilot features, such as SAS or other stabilization, serially in between the instructor and pilot control. Additional benefits can be realized from virtual coupling between student pilot and one or more remote instructor consoles in flight simulators.

In one embodiment, a flight simulation system and method with electronic coupling of controls include a physical simulation environment providing flight simulation to a trainee. At least one physical control element is in the physical simulation environment. An instructor environment is located remote from the physical simulation environment. At least one instructor control element is in the instructor environment. The physical control element and the instructor control element are electronically and non-mechanically coupled together.

In one aspect, the physical control element replicates a feel of the instructor control element or the instructor control element replicates a feel of the physical control element.

In another aspect, force values of the physical control element or the instructor environment control are sensed with a torque sensor, a force sensor, or a motor load.

In yet another aspect, the physical control element and the instructor control element have a different size or scale, wherein force values between the physical control element and the instructor control element are matched.

In another aspect, force values coupled between the physical control element and the instructor control element are tuned to simulate a behavior of an aircraft.

In yet another aspect, the system further comprises a virtual stability augmentation system (SAS) connected between the physical simulation environment and the instructor environment.

In another aspect, the flight simulation further comprises a simulation of a helicopter, wherein the virtual SAS is positioned between a cyclic in the physical simulation environment and the cyclic in the instructor environment.

In yet another aspect, the instructor environment located remote from the physical simulation environment further comprises the instructor environment being located external to a simulator having the physical simulation environment or the instructor environment being located a long geographic distance from the physical simulation environment.

In another aspect, the physical control element and the instructor control element are electronically coupled together with at least one of: an ethernet cable directly connected between the physical control element and the instructor control element; or a network connection between the physical control element and the instructor control element.

In yet another aspect, the instructor environment further comprises a simulation environment simulating the flight simulation to the trainee.

In another embodiment, a flight simulation system with electronic coupled controls comprises: separate physical simulation environments, each providing flight simulation to a trainee; at least one physical control element in each of the at least two separate physical simulation environments; an instructor environment located remote from the at least two separate physical simulation environments; and at least one instructor control element in the instructor environment, wherein the physical control element for each of the at least two separate physical simulation environments and the instructor control element are electronically and non-mechanically coupled together.

In one aspect, force values of the physical control elements for each of the at least two separate physical simulation environments or the instructor environment control are sensed with at least one of: a torque sensor, a force sensor, or a motor load.

In another aspect, the physical control element for each of the at least two separate physical simulation environments and the instructor control element have a different size or scale, wherein force values between the physical control element for each of the at least two separate physical simulation environments and the instructor control element are matched.

In yet another aspect, force values coupled between the physical control element for each of the at least two separate physical simulation environments and the instructor control element are tuned to simulate a behavior of an aircraft.

In another aspect, the system further comprises a virtual stability augmentation system (SAS) connected between the at least two separate physical simulation environment and the instructor environment.

In yet another embodiment, a method for providing a flight simulation with electronic coupled controls, the method comprises providing a flight simulation to a trainee positioned in a physical simulation environment, wherein at least one physical control element is within the physical simulation environment; and manipulating, by an instructor, at least one instructor control element within an instructor environment located remote from the physical simulation environment, wherein the physical control element and the instructor control element are electronically and non-mechanically coupled together.

In one aspect, the method further comprises sensing force values of the physical control element or the instructor environment control with at least one of: a torque sensor, a force sensor, or a motor load.

In another aspect, the method further comprises matching force values between the physical control element and the instructor control element when the physical control element and the instructor control element have a different size or scale.

In yet another aspect, the method further comprises tuning force values coupled between the physical control element and the instructor control element to simulate a behavior of an aircraft.

In another aspect, the method further comprises connecting a virtual stability augmentation system (SAS) between the physical simulation environment and the instructor environment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings.

DETAILED DESCRIPTION

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

To improve over these limitations of conventional simulation system, the present disclosure is directed to a simulation system and method with electronic coupling of controls, which allows for a virtual coupling solution between an instructor and a student console in a flight simulator. Such a virtual coupling can effectively tune the controls to aircraft-specific torques in a cockpit configuration. Additionally, virtual coupling can integrate specific autopilot features, such as SAS or other stabilization, serially in the control. Additional benefits can be realized from virtual coupling between student pilot and one or more remote instructor consoles in flight simulators.

Figure 1:
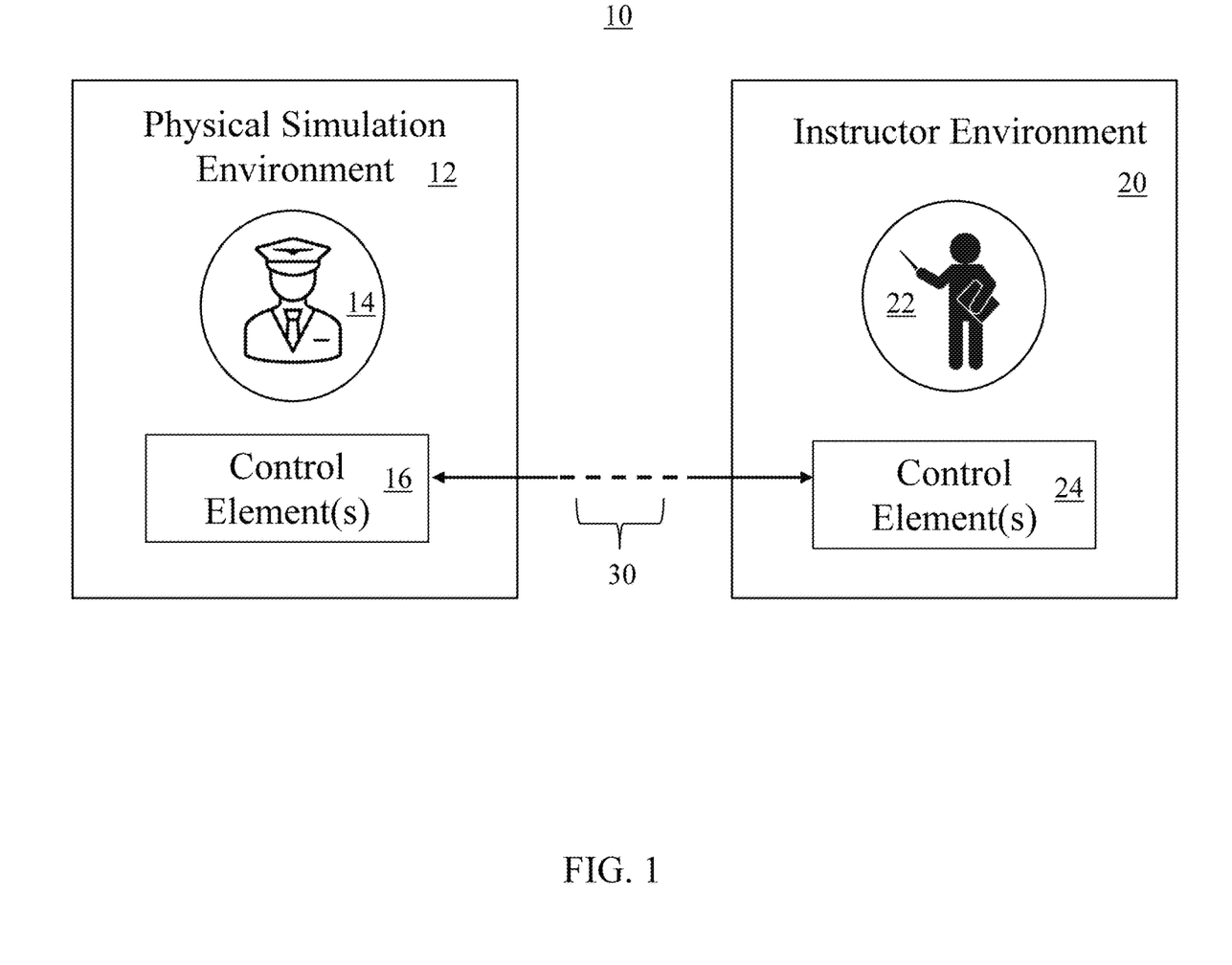
FIG. 1 is a diagrammatic illustration of a flight simulation system with electronic coupled controls, in accordance with the present disclosure.

FIG. 1 is a diagrammatic illustration of a flight simulation system 10 with electronic coupled controls, in accordance with the present disclosure. As shown in FIG. 1, the flight simulation system 10 includes a physical simulation environment 12 providing flight simulation to a pilot 14 using the simulator. The pilot 14 may be a student pilot or another personnel who is receiving simulator training. At least one physical control element 16 is in the physical simulation environment 12. An instructor environment 20 is located remote from the physical simulation environment 12. An instructor 22 may use and be present at the instructor environment. At least one instructor control element 24 is in the instructor environment 20. The at least one physical control element 16 and the at least one instructor control element 24 are electronically and non-mechanically coupled together with an electronic coupling 30. In this design, the control elements 16, 24 are in communication through an electronic communication system, but they do not have any mechanical linkages, mechanical components, or other devices which transfer mechanical forces therebetween.

Unlike conventional cockpits, where the instructor and student flight controls are mechanically coupled, the system 10 uses electronic coupling of controls between the physical simulation environment 12 and the instructor environment 20, which allows for remote instruction. With remote instruction, the instructor may be located at an instructor desk, which may be in front of the motion platform of the physical simulation environment 12, thereby allowing the instructor 22 and student pilot 14 to be face-to-face, or the instructor 22 may be in an entirely different physical location any distance from the physical simulation environment 12. For instance, the remote instructor 22 may be in a different physical location, different building, different city, country, or continent from the physical simulation environment 12. This ability for an instructor 22 to provide instruction remotely allows for a more efficient utilization of instructors which is not possible with mechanically connected controls of conventional systems.

To allow electronic and non-mechanical coupling of controls to a remote instructor 22, a control loading system (CLS) 110, 120 in the cockpit is electronically coupled with the CLS 110, 120 at the instructor environment 20 replicating the feeling of mechanical coupling. The electrical coupling may be achieved using any type of non-mechanical communication, including over an ethernet cable, using optical signals, using wireless communication protocols, or any combination thereof. Force values representing a force or similar physical parameter of the control elements 16, 24 can be coupled. The coupled values between the control elements 16, 24 are tuned to simulate the behavior of the real aircraft.

Optionally, a virtual Stability Augmentation System (SAS) may be added serially between the physical simulation environment 12 and the instructor environment 20 to aid with attitude stabilization from the instructor desk. The system 10 allows bidirectional inputs between the instructor and student, with tunable force gains: the instructor may feel the actions of the student, intervene if necessary or give the pilot hints by slightly pressing to a direction, and the instructor will also feel when the student is acting against his input.

The system 10 may offer substantial benefits over conventional simulators. For instance, the system 10 may be built with a smaller form factor and/or more cheaply if there is no need for a second seat on the moving platform. A virtual coupling between two seats may allow the instructor desk or simulator to be more easily reconfigured, physically moved, or to work across large distances, which may include distances measured in meters, kilometers, or hundreds of kilometers. In the case where a conventional simulator is retrofitted with the system 10, and an instructor can sit on the platform of the simulator, a third person may be required to operate the instructor station at the instructor environment 20 in order to operate the emergency shut-off for safety purposes and to operate the instructor controls. An additional benefit is that instructors may be more efficiently utilized, e.g., a US-based instructor may teach a Switzerland-based student, or one instructor may, without taking time to move, teach students in five different locations all in the same day. Additionally, the instructor controls need a keyboard and a screen for which there not sufficient space in small cockpits.

Figure 2:
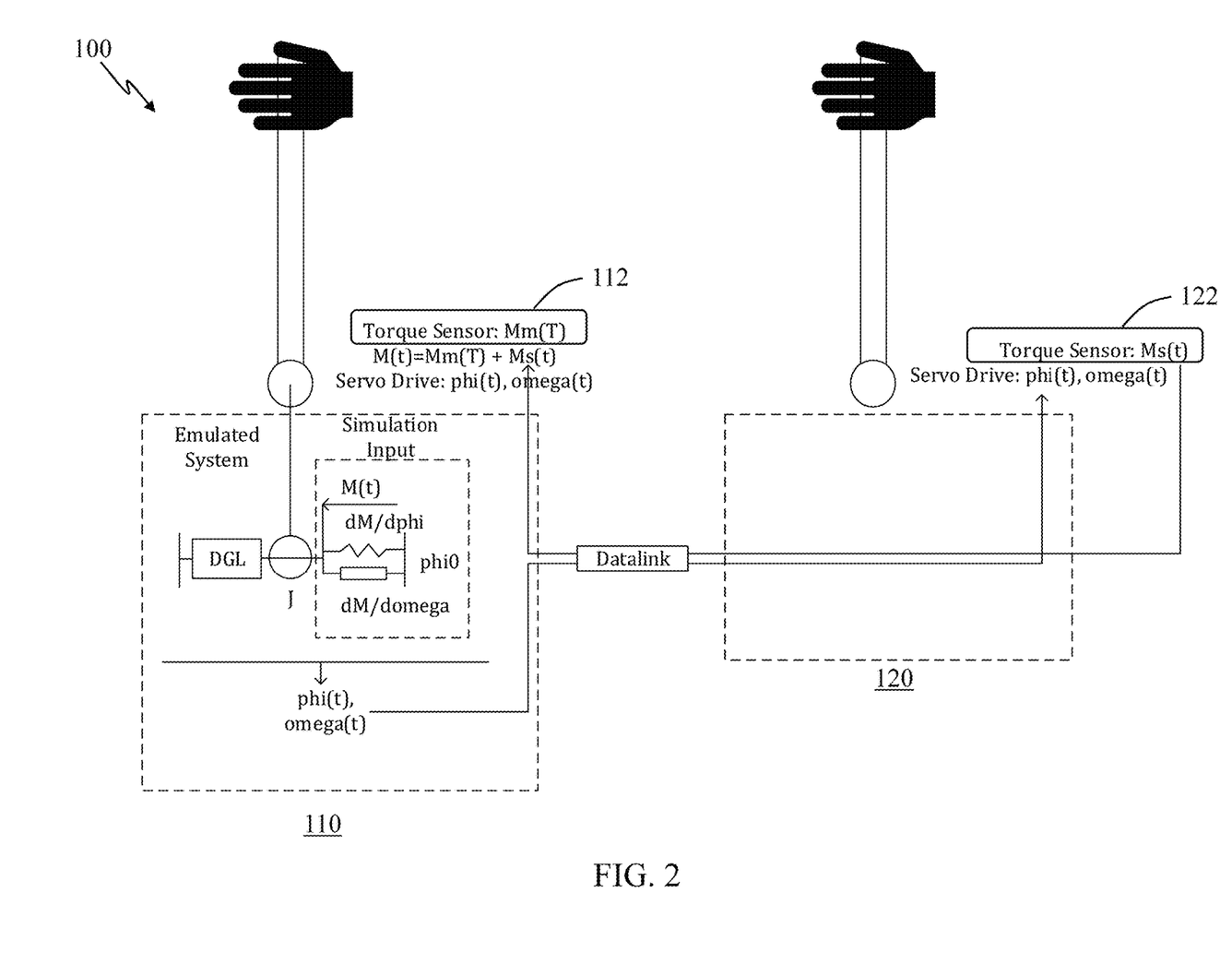
FIG. 2 is a diagrammatic illustration of control schema between a primary CLS and a secondary CLS used in the flight simulation system with electronic coupled controls of FIG. 1, in accordance with the present disclosure.

FIG. 2 is a diagrammatic illustration 100 of control schema between a primary CLS 110 and a secondary CLS 120 used in the flight simulation system 10 with electronic coupled controls of FIG. 1, in accordance with the present disclosure. As shown, the instructor desk and student cockpit are tied together in a primary/secondary CLS configuration, where the primary CLS 110 is denoted with the "m" subscript and the secondary CLS 120 is denoted with the "s" subscript.

In the embodiment depicted in FIG. 2, the primary and secondary CLS 110, 120 both have a torque sensor 112, 122, respectively. In other embodiments, other types of sensors may be incorporated, such as force sensors, or other types of sensors. Other devices or systems of measuring torque may be used, such as motor load. In operation, the torque sensor 122 from the secondary CLS 120 sends the sensed value to the primary CLS 110. In the primary CLS 110, the secondary torque is added to the measured torque. The sum is then applied to the differential equation simulating the behavior of the real control system of the aircraft. This results in the position and speed which the real controls would have. The primary CLS 110 servo drive tracks these values. They are also sent to the secondary CLS 120 and its servo drive tracks them as well resulting in the same position and speed of the control.

The datalink described in FIG. 2 is via ethernet, but it may also be achieved via the Internet, a network connection, or any other digital and/or analog link.

In some embodiments, it may be the case that the controls on the instructor desk are a scaled down or scaled up length of that of the cockpit. For example, the controls on the table may be ⅓ the length of that in the cockpit. In this case, a force gain may be introduced to allow the instructor to have more power than the pilot, but because the length is shorter, the force feels equal. The force gain values are tuned to the specific scale used. Force gains may also be introduced for other reasons for teaching and could be tuned for the student as well.

Figure 3:
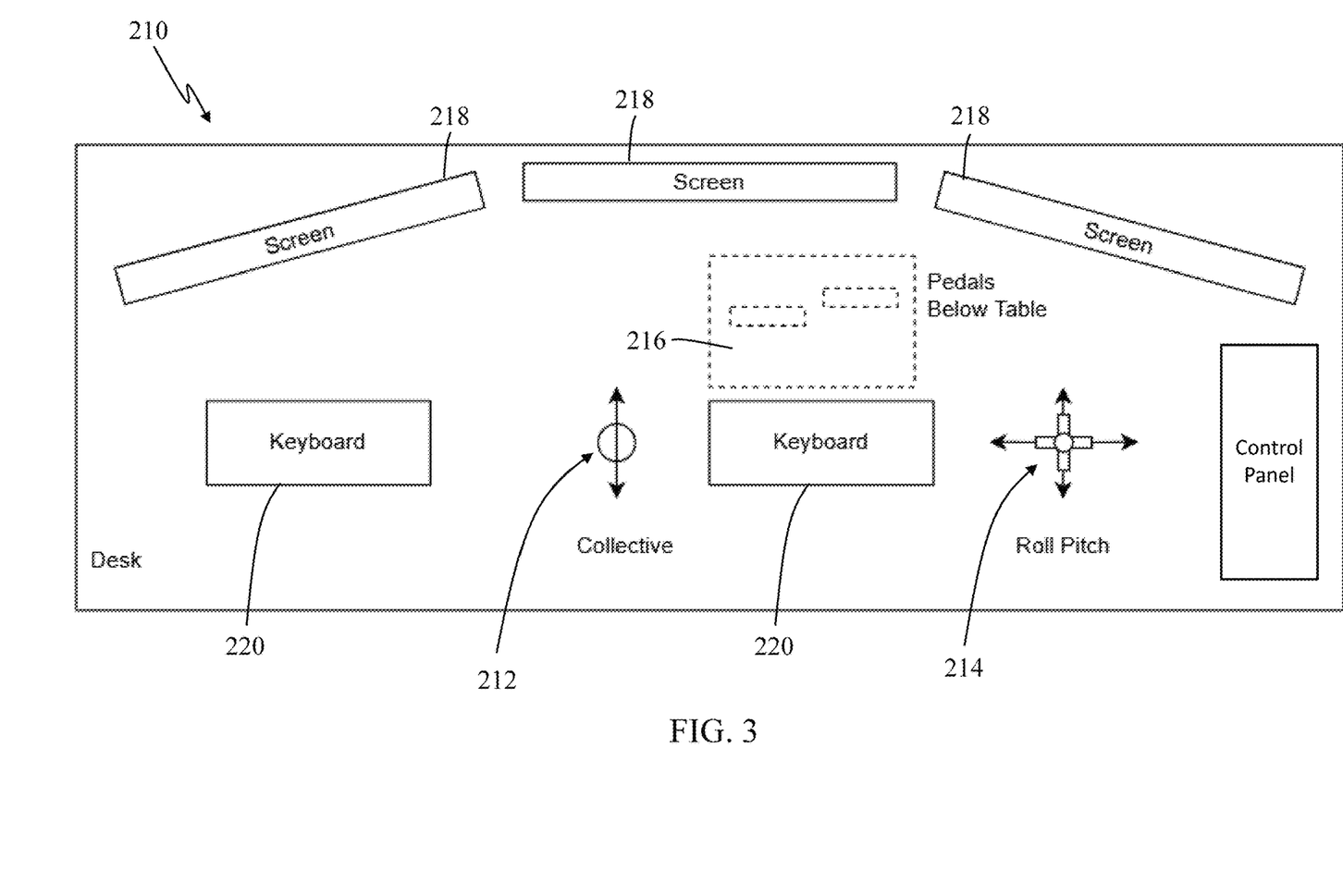
FIG. 3 is a diagrammatic illustration depicting an implementation of the layout of controls at the instructor environment of the flight simulation system with electronic coupled controls of FIG. 1, in accordance with the present disclosure.

FIG. 3 is a diagrammatic illustration depicting an implementation of the layout of controls at the instructor environment 210 of the flight simulation system 10 with electronic coupled controls of FIG. 1, in accordance with the present disclosure. As shown in FIG. 3, the layout of the controls in the instructor environment 210, in this embodiment, may include the collective joystick 212 and roll pitch joystick 214 being placed on the left and right side of the pilot, respectively. Pedals 216 may be located below the instructor station table, where the pedals are mechanically equivalent to the pedals in the cockpit. One or more visual displays 218 are provided to the instructor, along with one or more keyboards 220. A Control Panel with safety-relevant hardwired buttons, including an emergency shut off button, may also be included. The electronic coupling between the instructor and pilot student environments can be activated and deactivated while the system is running without the student noticing anything. When the coupling is deactivated, the instructor CLS can be used as an additional input device to act on the autopilot settings.

In some implementations, user experience may be improved by adding buttons on the grip of the controller to activate or deactivate the autopilot on each axis. This use of additional buttons may allow for a faster reaction to activate the autopilot in case of lost control, because it may take too long to reach over from the digitally coupled CLS to the mouse.

Figure 4:
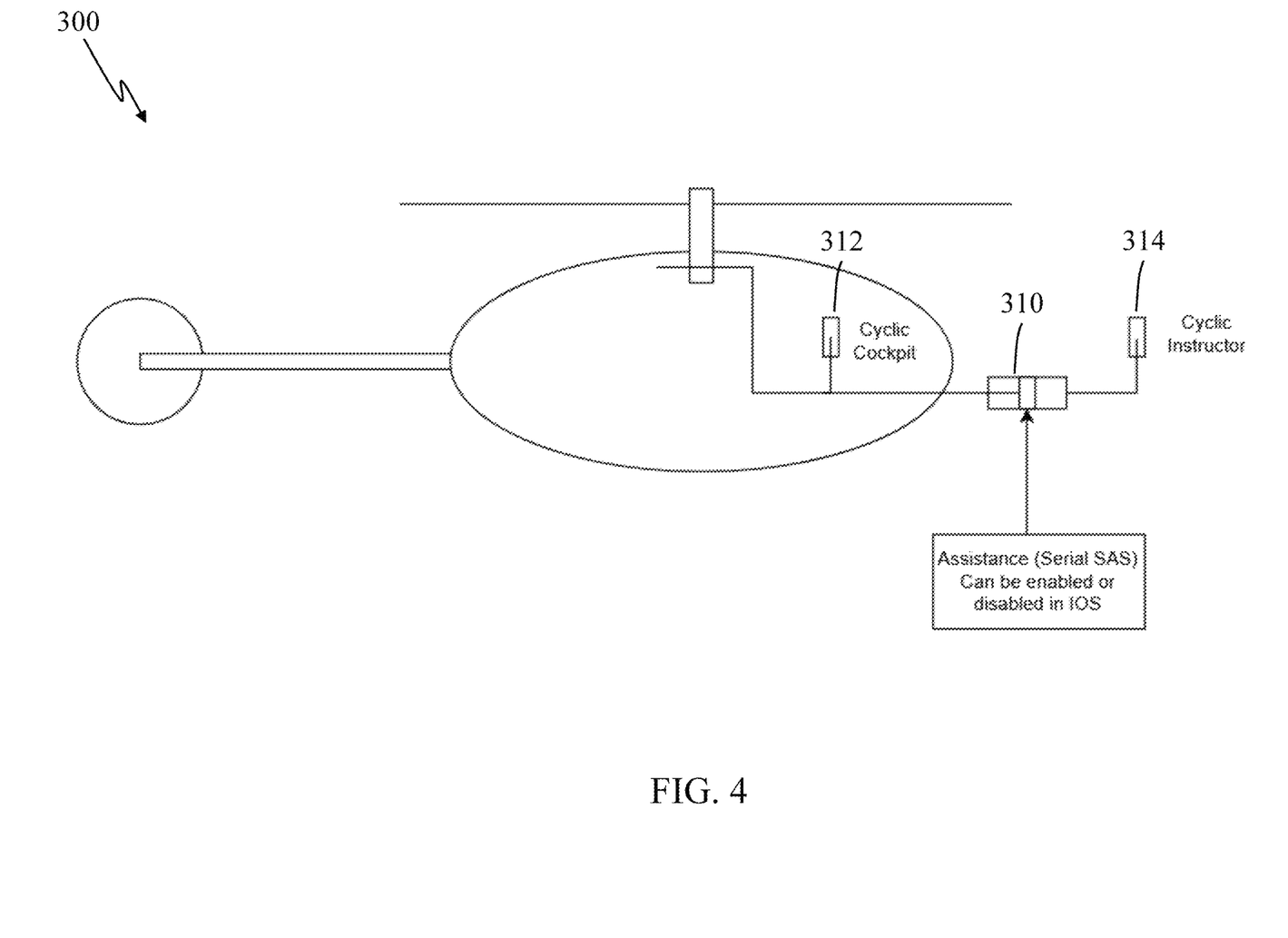
FIG. 4 is a diagrammatic illustration depicting a cyclic in a cockpit in a helicopter, the SAS added serially in the virtual coupling schema, and an instructor cyclic of the flight simulation system with electronic coupled controls of FIG. 1, in accordance with the present disclosure.

FIG. 4 is a diagrammatic illustration 300 depicting a cyclic (a cyclic control) in a helicopter cockpit, the SAS added serially in the virtual coupling schema, and an instructor cyclic of the flight simulation system 10 with electronic coupled controls of FIG. 1, in accordance with the present disclosure. An additional issue with simulators is that flying the helicopter from the instructor desk is much more difficult than flying it in the cockpit. This is because it is harder to guess the attitude on the screen. In implementations where the instructor desk is scaled shorter than the cockpit, shorter controls are more sensitive to inputs which also makes flying difficult. In the virtual coupling system of this disclosure, a serial SAS (Stability Augmentation System) 310 is added between the cyclic 312 on the instructor desk and the cyclic 314 in the cockpit, as shown in FIG. 4. This makes it easier to hold the attitude steady from the instructor desk, but it does not in any way influence the behavior of the aircraft when controlling it in the cockpit.

A serial SAS in a real aircraft stabilizes by making the connection between the cyclic and the swashplate longer or shorter. The techniques of the subject disclosure operate on a similar principle, but they utilize the virtual connection between the instructor and the cockpit cyclic.

The system may include various alternate implementations or embodiments. For instance, in one example, the system may also be used to couple two cockpits together, thereby providing, in effect, a dual cockpit without mechanical linking between the two cockpits. This system may function over a geographic distance, including a long geographic distance greater than 100 meters, and is only limited by the interface delay. Long geographic distances may also include distances of greater than 1 km, greater than 100 km, or greater than 1,000 km, such as where the two cockpits are located in different cities or countries. For implementations that work over long distances on the order of several kilometers, there may be some amount of delay. Some interface delay may be permissible within an acceptable range (e.g. 50 ms or less). Compensation techniques, such as those which may be known from the gaming industry or similar industries, may be implemented for interface delay over the acceptable range.

Additionally, it is also possible to couple more than two devices, for example three devices with a dual cockpit and instructor station.

Different kinds of assistance may be added serially in the virtual connection. This may include dampening along different axes (e.g. pitch and yaw) or controlled steering.

It may be difficult to operate the aircraft from the instructor station in some implementations. To help with this scenario, a virtual reality instructor station that incorporates the originally sized aircraft controls with a virtual screen showing instructor station controls rather than the cockpit replica may be used.

Figure 5:
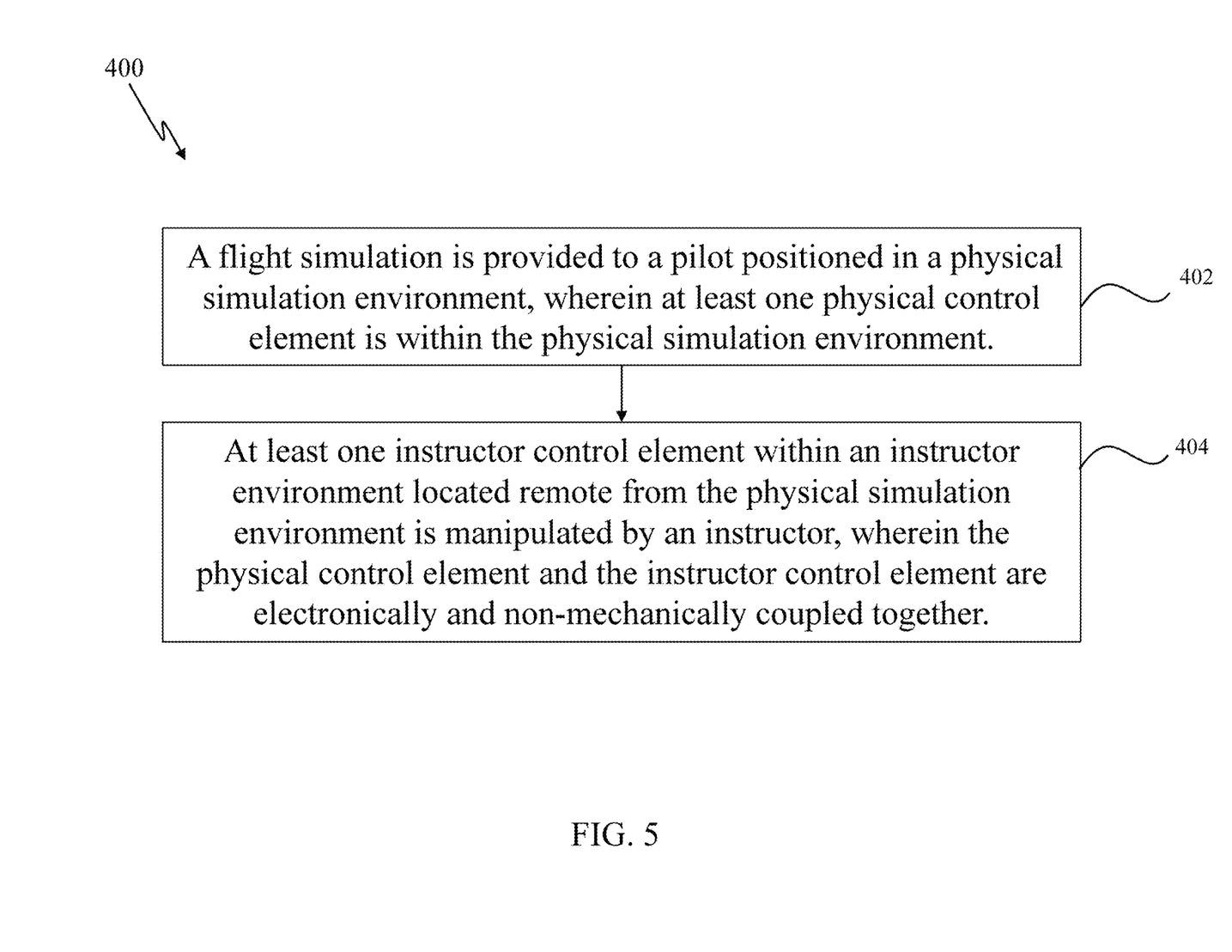
FIG. 5 is a flowchart illustrating a method for providing a flight simulation with electronic coupled controls, in accordance with embodiments of the disclosure.

FIG. 5 is a flowchart 400 illustrating a method for providing a flight simulation with electronic coupled controls, in accordance with embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, a flight simulation is provided to a pilot positioned in a physical simulation environment, wherein at least one physical control element is within the physical simulation environment. At least one instructor control element within an instructor environment located remote from the physical simulation environment is manipulated by an instructor, wherein the physical control element and the instructor control element are electronically and non-mechanically coupled together (block 404). Any number of additional steps, functions, processes, or variants thereof may be included in the method, including any disclosed relative to any other figure of this disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

LIST OF REFERENCES

10 flight simulation system
12 physical simulation environment
14 pilot/trainee
16 physical control element
20 An instructor environment
24 instructor control element
30 electronic coupling
100 flowchart
110 primary CLS
112 torque sensor
120 secondary CLS
122 torque sensor
210 instructor environment
212 collective joystick
214 roll pitch joystick
216 pedals
218 visual displays
220 keyboard(s)
300 diagram of cyclic control (cockpit)
310 stability augmentation system (SAS)
312 cyclic (instructor)
314 cyclic (cockpit)
400 flowchart
402, 404 step

What is claimed is:

1. A flight simulation system with electronic coupled controls comprising:
   a physical simulation environment providing flight simulation to a trainee;
   at least one physical control element in the physical simulation environment;
   an instructor environment located remote from the physical simulation environment;
   at least one instructor control element in the instructor environment, wherein the physical control element and the instructor control element are electronically and non-mechanically coupled together, and
   further comprising a virtual stability augmentation system (SAS) connected between the physical simulation environment and the instructor environment.

2. The system of claim 1, wherein at least one of:
   the physical control element replicates a feel of the instructor control element; or
   the instructor control element replicates a feel of the physical control element.

3. The system of claim 1, wherein force values of the physical control element or the instructor environment control are sensed with at least one of: a torque sensor, a force sensor, or a motor load.

4. The system of claim 1, wherein the physical control element and the instructor control element have a different size or scale, wherein force values between the physical control element and the instructor control element are matched.

5. The system of claim 1, wherein force values coupled between the physical control element and the instructor control element are tuned to simulate a behavior of an aircraft.

6. The system of claim 1, wherein the flight simulation further comprises a simulation of a helicopter, wherein the virtual SAS is positioned between a cyclic in the physical simulation environment and the cyclic in the instructor environment.

7. The system of claim 1, wherein the instructor environment located remote from the physical simulation environment further comprises:
   the instructor environment being located external to a simulator having the physical simulation environment; or
   the instructor environment being located a long geographic distance from the physical simulation environment.

8. The system of claim 1, wherein the physical control element and the instructor control element are electronically coupled together with at least one of: an ethernet cable directly connected between the physical control element and the instructor control element; or a network connection between the physical control element and the instructor control element.

9. The system of claim 1, the instructor environment further comprise a simulation environment simulating the flight simulation to the trainee.

10. The system of claim 1, comprising:
    at least two separate physical simulation environments, each providing flight simulation to a trainee;
    at least one physical control element in each of the at least two separate physical simulation environments;
    an instructor environment located remote from the at least two separate physical simulation environments;
    at least one instructor control element in the instructor environment, wherein the physical control element for each of the at least two separate physical simulation environments and the instructor control element are electronically and non-mechanically coupled together.

11. The system of claim 10, wherein force values of the physical control elements for each of the at least two separate physical simulation environments or the instructor environment control are sensed with at least one of: a torque sensor, a force sensor, or a motor load.

12. The system of claim 10, wherein the physical control element for each of the at least two separate physical simulation environments and the instructor control element have a different size or scale, wherein force values between the physical control element for each of the at least two separate physical simulation environments and the instructor control element are matched.

13. The system of claim 10, wherein force values coupled between the physical control element for each of the at least two separate physical simulation environments and the instructor control element are tuned to simulate a behavior of an aircraft.

14. A flight simulation system with electronic coupled controls comprising:
   a physical simulation environment providing flight simulation to a trainee;
   at least one physical control element in the physical simulation environment;
   an instructor environment located remote from the physical simulation environment;
   at least one instructor control element in the instructor environment, wherein the physical control element and the instructor control element are electronically and non-mechanically coupled together, and
   further comprising a virtual stability augmentation system (SAS) connected between the at least two separate physical simulation environment and the instructor environment.

15. A method for providing a flight simulation with electronic coupled controls, the method comprising:
   providing a flight simulation to a trainee positioned in a physical simulation environment, wherein at least one physical control element is within the physical simulation environment;
   manipulating, by an instructor, at least one instructor control element within an instructor environment located remote from the physical simulation environment, wherein the physical control element and the instructor control element are electronically and non-mechanically coupled together, and
   further comprising connecting a virtual stability augmentation system (SAS) between the physical simulation environment and the instructor environment.

16. The method of claim 15, further comprising sensing force values of the physical control element or the instructor environment control with at least one of: a torque sensor, a force sensor, or a motor load.

17. The method of claim 15, further comprising matching force values between the physical control element and the instructor control element when the physical control element and the instructor control element have a different size or scale.

18. The method of claim 15, further comprising tuning force values coupled between the physical control element and the instructor control element to simulate a behavior of an aircraft.

* * * * *